US010344572B2

(12) United States Patent
Alqahtani

(10) Patent No.: US 10,344,572 B2
(45) Date of Patent: *Jul. 9, 2019

(54) APPARATUS AND METHOD FOR PRODUCING OIL AND GAS USING BUOYANCY EFFECT

(71) Applicant: Saudi Arabian Oil Company, Dhahran (SA)

(72) Inventor: Mari Hussain Alqahtani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/495,929

(22) Filed: Sep. 25, 2014

(65) Prior Publication Data

US 2015/0090124 A1 Apr. 2, 2015

Related U.S. Application Data

(60) Provisional application No. 61/884,724, filed on Sep. 30, 2013.

(51) Int. Cl.
*B01D 19/00* (2006.01)
*E21B 43/01* (2006.01)
(Continued)

(52) U.S. Cl.
CPC ...... *E21B 43/0107* (2013.01); *B01D 17/0214* (2013.01); *B01D 19/00* (2013.01);
(Continued)

(58) Field of Classification Search
CPC ........ E21B 43/36; E21B 43/01; E21B 43/121; E21B 43/0122; E02B 17/02;
(Continued)

(56) References Cited

U.S. PATENT DOCUMENTS 233,319 A 10/1880 Boerner
2,293,196 A 8/1942 Crump
(Continued)

FOREIGN PATENT DOCUMENTS

WO 2004/0004863 A1 1/2004

OTHER PUBLICATIONS

PCT International Search Report and The Written Opinion of the International Search Authority dated Jul. 20, 2015; International Application No. PCT/US2014/057178; International Filing Date: Sep. 24, 2014.

(Continued)

*Primary Examiner* — T. Bennett McKenzie
(74) *Attorney, Agent, or Firm* — Bracewell LLP; Constance G. Rhebergen; Linda L. Morgan

(57) ABSTRACT

A method of producing oil and gas from a gathering manifold or a well. The method includes the steps of channeling field production into a sealed vessel through an inlet pipe, and permitting oil and gas components of the field production to separate naturally from water and other fluids within the vessel. The method further includes the steps of evacuating the separated oil and gas from the vessel via pipelines attached to the vessel at locations corresponding to the separated oil and gas, and pumping seawater into the vessel to pressurize the vessel and thereby aid in the production of oil and gas from the vessel.

11 Claims, 14 Drawing Sheets

(51) Int. Cl.

| | | |
|---|---|---|
| *B01D 17/02* | (2006.01) | |
| *E02B 17/02* | (2006.01) | |
| *E21B 43/36* | (2006.01) | |
| *B65D 25/38* | (2006.01) | |
| *B65G 17/00* | (2006.01) | |
| *E21B 43/12* | (2006.01) | |
| *E02B 17/00* | (2006.01) | |

(52) U.S. Cl.
CPC ............ *B65D 25/38* (2013.01); *B65G 17/00* (2013.01); *E02B 17/02* (2013.01); *E21B 43/01* (2013.01); *E21B 43/0122* (2013.01); *E21B 43/121* (2013.01); *E21B 43/36* (2013.01); *E02B 2017/0039* (2013.01)

(58) Field of Classification Search
CPC .. E02B 2017/0039; B01D 19/00–0495; B01D 17/00–12; B01D 17/0214; B65D 25/38; B65G 17/00
USPC ................ 95/241–266; 96/183; 166/357
See application file for complete search history.

(56) References Cited

U.S. PATENT DOCUMENTS

| | | |
|---|---|---|
| 2,947,437 A | 8/1960 | Greer |
| 3,488,967 A | 1/1970 | Toossi |
| 3,666,100 A | 5/1972 | Madej |
| 4,139,463 A | 2/1979 | Murphy et al. |
| 4,226,717 A | 10/1980 | Malm |
| 4,380,151 A | 4/1983 | Miller |
| 4,531,860 A | 7/1985 | Barnett |
| 4,604,196 A | 8/1986 | Lowrie et al. |
| 4,685,833 A | 8/1987 | Iwamoto |
| 4,790,936 A | 12/1988 | Renfrow |
| 5,044,440 A | 9/1991 | Stinessen et al. |
| 5,154,835 A | 10/1992 | DeMichael |
| 5,224,482 A | 7/1993 | Nikoonahad et al. |
| 5,226,482 A | 7/1993 | Giannesini et al. |
| 6,238,569 B1 | 5/2001 | Favret, Jr. |
| 7,886,829 B2 | 2/2011 | Edwards |
| 2002/0017193 A1* | 2/2002 | Ramos ............... B01D 19/0042 95/260 |
| 2006/0032375 A1 | 2/2006 | Verscharen |
| 2008/0105616 A1* | 5/2008 | Allouche ........... B01D 17/0211 210/637 |
| 2008/0135257 A1 | 6/2008 | Zhang et al. |
| 2012/0087729 A1 | 4/2012 | Oesterberg et al. |
| 2012/0121335 A1* | 5/2012 | Fedotov ................. E21B 43/34 405/64 |
| 2012/0247784 A1 | 10/2012 | Lacy |
| 2013/0058722 A1* | 3/2013 | Kryzak ............... E21B 43/0122 405/60 |
| 2013/0065799 A1* | 3/2013 | Leinweber ............ C08F 220/26 507/119 |
| 2013/0118754 A1 | 5/2013 | Worrall et al. |
| 2013/0193048 A1* | 8/2013 | Theegala ........... B01D 17/0208 210/170.05 |
| 2013/0199792 A1 | 8/2013 | Backes |
| 2014/0008304 A1* | 1/2014 | Jansen .................. B01D 17/12 210/708 |
| 2015/0240605 A1* | 8/2015 | Vu ...................... E21B 43/0122 405/64 |

OTHER PUBLICATIONS

PCT Partial International Search Report dated May 12, 2015; International Application No. PCT/US2014/057178; International Filing Date: Sep. 24, 2014.

* cited by examiner

APPARATUS AND METHOD FOR PRODUCING OIL AND GAS USING BUOYANCY EFFECT

CROSS REFERENCE TO RELATED APPLICATION

This application claims priority to and the benefit of U.S. Provisional Application Ser. No. 61/884,724, which was filed Sep. 30, 2013, the full disclosure of which is hereby incorporated herein by reference in its entirety.

BACKGROUND OF THE INVENTION

1. Field of the Invention

The present technology relates to oil and gas production. In particular, the present technology relates to oil and gas production from subsea gathering manifolds or wells using buoyancy.

2. Description of the Related Art

The production of oil and gas from subsea gathering manifolds or oil wells typically requires raising crude oil through a riser from the seabed to the sea surface. This procedure has inefficiencies, including, for example, pressure drop within the riser. This pressure drop increases when the crude oil pressure falls below the bubble point, which changes the flow from a single-phase to a two-phase flow.

In addition, separation of oil and gas from crude oil is typically carried out at an onshore gas oil separation plant. This requires, after the crude oil reaches the platform through the risers, multiphase pumps to ship the crude oil to the onshore plant. Accordingly, an oil producer must invest in expensive equipment, such as oil pumps and gas compressors, and gas oil separation plants.

SUMMARY OF THE INVENTION

The present technology provides a method of producing oil and gas from a subsea gathering manifold or well. The method includes the steps of channeling field production into a sealed, partially submerged, and/or seawater-filled vessel through an inlet pipe, and permitting oil and gas components of the field production to separate naturally from water and other fluids within the vessel. The method also includes evacuating the separated oil and gas from the vessel via pipelines attached to the vessel at locations corresponding to the separated oil and gas, and pumping seawater into the vessel to pressurize the vessel and thereby aid in the production of oil and gas from the vessel.

In some embodiments, the method can further includes lowering the pressure in the vessel to allow for gas to gather to the top of the vessel. In addition, the step of stopping the introduction of seawater into the vessel before the vessel reaches a maximum allowable pressure of the inlet pipe can be included.

In other embodiments, the method can include insulating or heating the vessel to reduce cooling of the vessel to minimize the formation of hydrates within the vessel, as well as adding anti-hydrate additives to the seawater pumped into the vessel to further minimize the formation of hydrates within the vessel. Furthermore, the method can include limiting the flow rate of seawater pumped into the vessel to reduce emulsion of the seawater with oil in the vessel.

The present technology also provides a method of installing a gas and oil production vessel at an offshore gathering manifold or well site. The method includes towing the vessel to an offshore manifold or a well site with a ship, tilting the vessel into an upright position, with the top of the vessel oriented above the bottom of the vessel, and partially filling the vessel with seawater until the vessel is partially submerged. In addition, the method includes fixing the vessel to the seabed using pillars or cables, or a combination of pillars and cables, connecting a pipe from the gathering manifold or well to the bottom of the vessel to deliver field production to the vessel, connecting production pipes at predetermined locations on the vessel for flowing oil and gas away from the vessel, connecting pumps to the vessel to pump seawater into the vessel for purposes of pressurizing the vessel.

In certain embodiments, the method can include the step of releasing air from an upper portion of the vessel as seawater enters the vessel, as well as filtering the seawater as it enters the vessel to prevent contaminates from entering the vessel. In addition, the method can include attaching air-filled spheres to the vessel using cables, the air-filled spheres designed to float on the sea surface to help support the vessel, as well as pumping seawater into the vessel to evacuate remaining air from the vessel, and to pressurize the oil and gas within the vessel.

The present technology also provides a system for bringing produced oil and gas from a subsea gathering manifold or a wellhead to a sea surface. The system includes a vessel containing seawater, and extending from a subsea position to the sea surface, as well as an inlet pipe attached to the bottom of the vessel to deliver produced oil and gas from the subsea wellhead to the bottom of the vessel, so that the oil, gas, and water is combined inside the vessel and allowed to naturally separate inside the vessel. Furthermore, the system includes a pump attached to the vessel to pump water into the vessel to pressurize the vessel, and at least first, second, and third pipes attached to the vessel at predetermined locations to pull fluids from the vessel, the first pipe attached to an upper portion of the vessel to collect gas that has separated to the upper portion of the vessel, the second pipe attached to a central portion of the vessel to collect oil that has separated to the central portion, between the gas and the seawater; and the third pipe attached to a lower portion of the vessel to collect seawater that has separated to the lower portion of the vessel.

In some embodiments of the technology, the vessel can be sealed to maintain a desired pressure, and insulated to control temperature. Furthermore, the vessel can be tapered, having a larger cross section at a lower end and a smaller cross-section at an upper end, thereby concentrating oil and gas to concentrate in the upper portions of the vessel for ease of production. In addition, the system can further include filters attached to the vessel or the pump to filter seawater being pumped into the vessel, and a scraper in the vessel to scrape the bottom of the vessel and clear the bottom of the vessel of resins or asphaltenes that may collect on the bottom of the vessel.

BRIEF DESCRIPTION OF THE DRAWINGS

The present technology will be better understood on reading the following detailed description of nonlimiting embodiments thereof, and on examining the accompanying drawings, in which.

DETAILED DESCRIPTION OF THE EXEMPLARY EMBODIMENTS

Figure 1:
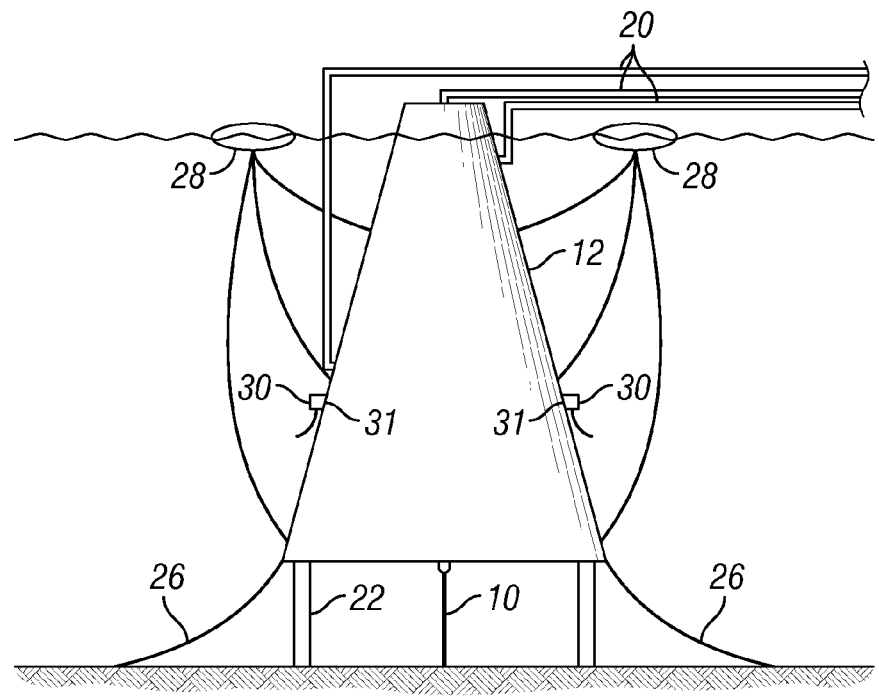
FIG. 1 is a side schematic view of an oil and gas production system according to an embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the embodiments are not intended to be limited to the specific terms used, and it is to be understood that each specific term includes equivalents that operate in a similar manner to accomplish a similar purpose.

The technology disclosed herein includes a method that utilizes buoyancy to help produce oil and/or gas production from the seabed to a sea surface. In one example embodiment, as described in detail below, oil and gas is gathered in a production manifold, and then released into the bottom of a vessel that is filled with seawater. This sealed vessel can have many beneficial characteristics. For example, it can be sealed, insulated, and/or temperature controlled. Furthermore, the sealed vessel can replace other structures, such as production risers, offshore production platforms, and gas oil separation systems.

In certain embodiments, the sealed vessel can stretch from the seabed to the sea surface. It can be anchored to the seabed by metallic pillars or other appropriate mechanism, and is can have connected to it floating spheres that reach the sea surface, thereby serving to mark the position of the vessel. Within the vessel, the produced materials, after leaving the well and entering the vessel, separate into their individual components, such as oil, gas, and water. These components are permitted to separate naturally, based on the principle of buoyancy, with the oil rising above the water within the vessel.

To understand how the vessel of the present technology functions, it is necessary to understand the principle of buoyancy. Buoyancy is an upward force exerted by a surrounding fluid on an immersed object. According to Archimedes law, the value of a buoyant force is equal to the weight of the fluid the object displaces. Thus the net force exerted on a fully or partially immersed object becomes the summation of its weight (downward), overburden pressure (downward), and the buoyancy force (upward). The buoyant force is governed by the following equations:

$$F_{Net} = -M_{Object} * C_g - P_{OB} + F_{Buoyancy}$$

$$F_{Net} = -V_{Object} * \rho_{Object} * C_g - P_{OB} + V_{Object} * \rho_{Displaced\ Fluid} * C_g$$

$$F_{Net} = V_{Object} * C_g (\rho_{Displaced\ Fluid} - \rho_{Object}) - P_{OB}$$

In these equations, the symbols have the following meanings:
$F_{Net}$=Net Force
$M_{Object}$=Object Mass
$C_g$=Gravitation Acceleration Constant
$P_{OB}$=Overburden Pressure
$F_{Buoyancy}$=Buoyancy Force
$\rho_{Object}$=Object Density
$\rho_{Displaced\ Fluid}$=Displaced Fluid Density When the difference between the object and the fluid densities is large enough to overcome the overburden pressure, the object raises upward. The immersed object can be solid, liquid, or gas.

In the present technology, the buoyancy principle acts to raise crude oil to the top of the vessel, which causes a reduction in crude oil's pressure that leads to separating dissolved gas from crude oil, forming a distinct gas phase on top, oil phase in the middle, and water phase at the bottom. For example, oil and gas are immiscible with seawater at the sea bottom conditions. Therefore, oil and gas form a continuous distinctive phase. Furthermore, at the bottom of the sea, seawater is cold and dense. On the other hand, crude oil is produced at a relatively higher temperature, and is typically lighter in density than seawater. Accordingly, if crude oil and gas is mixed with seawater, the mixture will naturally settle out into individual layers of gas, oil, and water.

As desired by an operator, the individual components can then be extracted from the vessel. For example, gas can be produced from the top of the vessel (although a calculated amount of gas can be kept within the vessel for purposes of pressure control, if needed). Similarly, oil can be produced from a point at the side of the vessel corresponding to the level of the oil within the vessel. All other produced fluids, including water, can be produced from a lower point at the side of the vessel corresponding to the level of such fluids in the vessel. To maintain the desired vessel pressure, thereby maintaining the ability to effectively produce fluids from the vessel, ambient seawater can be pumped into the vessel. Such ambient seawater can be heated and/or filtered if desired.

Using the vessel shown and described herein, ships can receive oil directly from the vessel, and no longer have to rely on onshore separation facilities. Therefore, the vessel of the present technology can save the energy used to ship crude oil (through pipes or ships) to onshore gas and oil separation plants (GOSPs) for separation. Further, the method herein disclosed has the advantages of reducing capital and operating costs, extending the life of offshore reservoirs, being safe and environmentally sound, and being capable of being applied at any stage of production, even after abandonment of a reservoir or a well.

Figure 21:
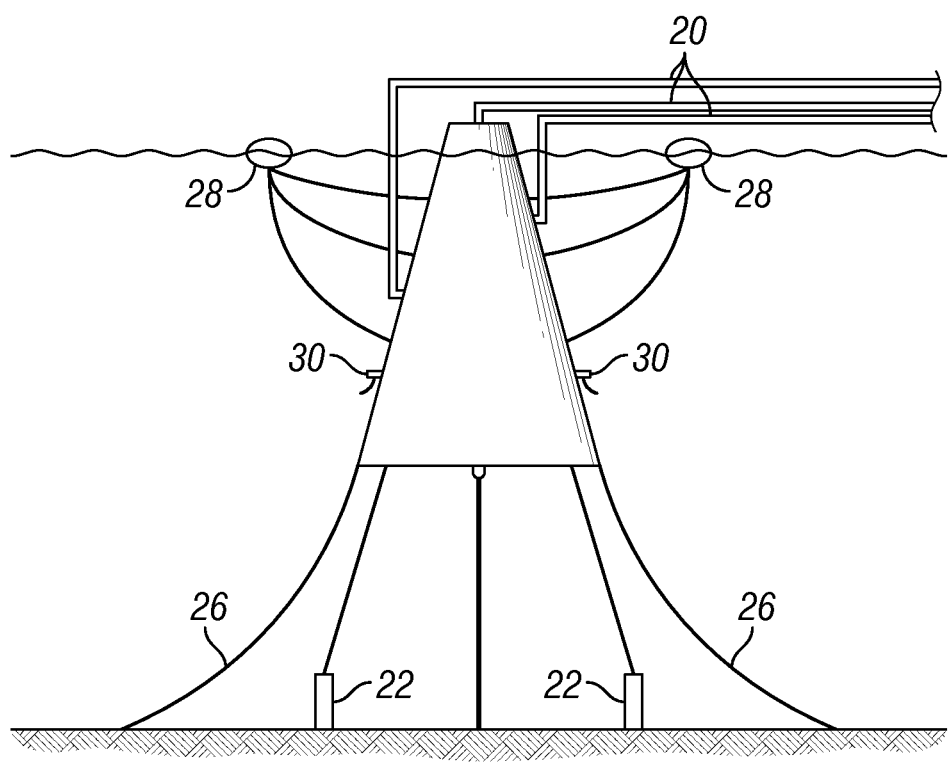
FIG. 21 is a side schematic view of an alternate embodiment of a system for producing oil and gas.

Referring now to FIG. 1, there is shown one embodiment of the present technology that utilizes buoyancy to deliver oil and gas production from the seabed to a sea surface. For example, in the embodiment shown, gathered field production is released from a vertical pipe 10, attached to a wellhead or a group of wellheads via a gathering manifold (not shown) into the bottom of a vessel 12. The vessel 12 is filled with seawater. The vertical pipe 10 is itself connected to a flowline coming from a well or a group of wells via a gathering manifold. In certain embodiments, the vessel 12 can be sealed, insulated, and potentially temperature controlled. In addition, the vessel 12 can stretch vertically form the seabed to the sea surface, and can taper from a larger diameter toward the seabed to a smaller diameter toward the sea surface. In some cases, such as where a reservoir is an ultra-deep offshore reservoir, a vessel 12 may not be able to extend from the seabed to the sea surface. In such a case, the vertical pipe 10 could be increased in length to compensate for the vessel 12 vertical length shortage, as shown in FIG. 21.

Figure 2:
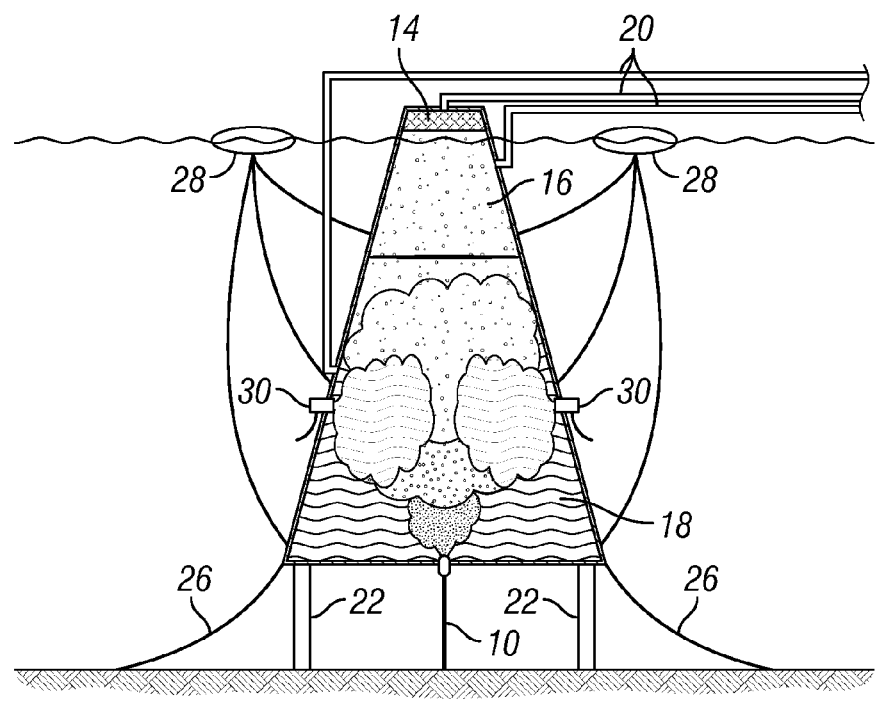
FIG. 2 is a side schematic view of the oil and gas production system shown in FIG. 1.

Inside the vessel 12, oil and gas rise to the top of the vessel 12 by buoyancy. During this rise, oil, gas, and formation water naturally separate. After separation, and as shown in FIG. 2, gas 14 rises to the top of the vessel 12, oil 16 rises to a midpoint in the vessel 12, and all other produced fluids 18, mixed with seawater in the vessel 12, are collect at the bottom of the vessel 12. As shown in FIG. 2, flowline 20, which may be, for example, pipes, connect to the vessel 12 at selective locations to pipe either the gas 14, oil 16, or other produced fluids 18 away from the vessel 12. As oil and gas enters the vessel 12, and is subsequently piped out of the vessel 12, the pressure within the vessel 12 can be maintained by pumping, or otherwise allowing the ingress of, ambient seawater (which could also be heated), into the sides of the vessel when needed. Seawater can be subjected to filtration prior to being pumped into the vessel 12.

Figure 3:
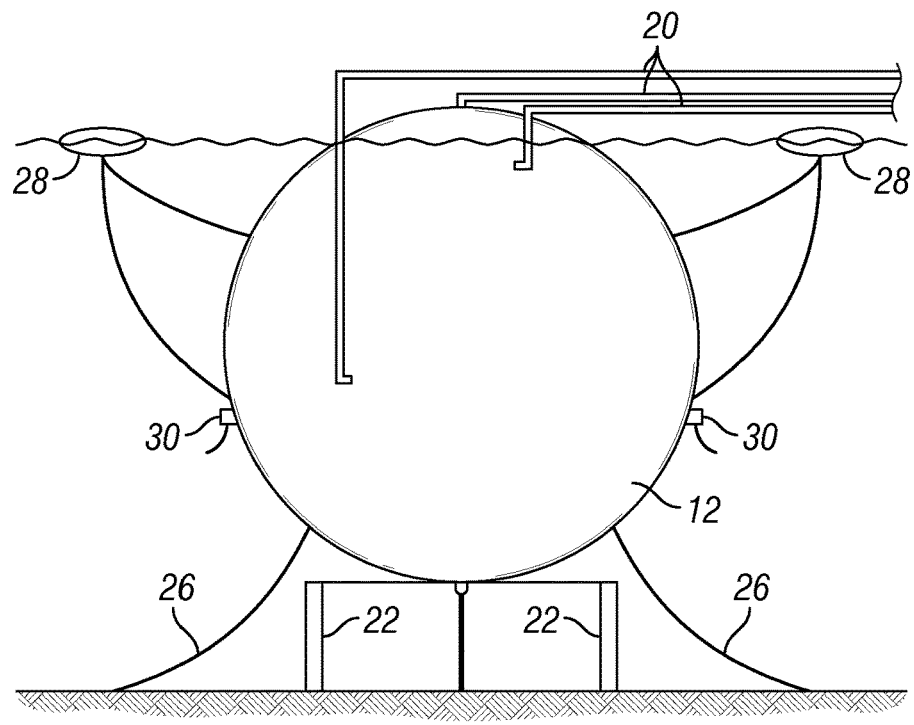
FIG. 3 is a side schematic view of an oil and gas production system according to an alternate embodiment of the present technology.
Figure 4:
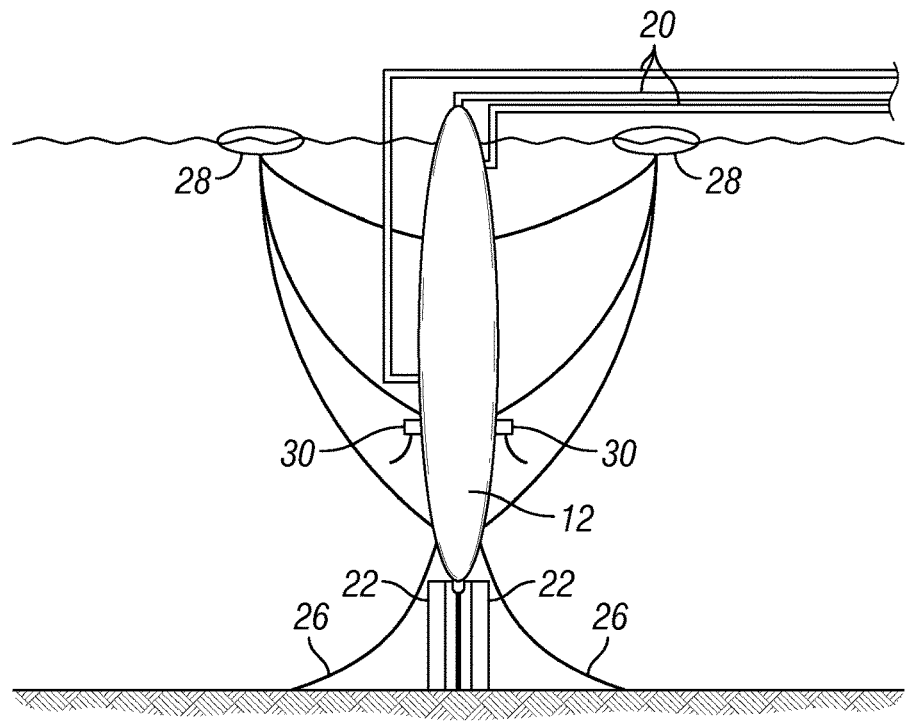
FIG. 4 is a side schematic view of an oil and gas production system according to yet another embodiment of the present technology.

Although the shape of the vessel 12 is shown in FIGS. 1 and 2 to be conical, the vessel 12 can be any appropriate shape. Tapered shapes, however, such as that of FIGS. 1 and 2, can be advantageous because they allow faster response of the Oil Water Line (OWL) and the Gas Oil Line (GOL) to injected water. Tapered shapes also allow significant volumes of oil and gas to be collected at or near the top of the vessel 12, which leads to expedited production. In addition, the tapered shape focuses the buoyant force on a smaller area, thus increasing the magnitude of the upward pressure force that the oil and gas exerts on the top of the vessel 12. This upward pressure force can help reduces the overall weight of the vessel on pillars 22 used to support the vessel 12 at the sea floor. Alternative shapes to the conical vessel 12 of FIGS. 1 and 2 could include, for example, a spherical vessel 12 (shown in FIG. 3), or a vessel 12 having an elliptical cross-section (shown in FIG. 4).

The technology disclosed herein could help in boosting oil and gas production from the vessel. For example, at initial stages of the production procedure, pressure can be intentionally lowered in the vessel to allow for a gas cap to form at the top. Then, seawater injection can begin, which increases pressure at the vessel up to the desired pressure level. Thereafter, the oil valve can be opened, and pressurized oil is evacuated from the vessel 12. Preferably, seawater injection stops when, or before, the vessel 12 reaches the maximum allowable pressure of the inlet pipe 10 at the bottom of the vessel 12.

In some embodiments, the vessel 12 can be insulated and/or temperature controlled. This is beneficial because gas can form hydrates in high pressure and low temperature environments. Insulating and maintaining the internal temperature of the vessel at appropriate levels can help prevent hydrates from forming. In addition, anti-hydrates additives can be added to the injected seawater as an added precaution.

In some embodiments, there can be a limit on the injected seawater flow rate. If the injected seawater enters the vessel 12 at too high a flow rate, it could create emulsion with produced oil. When emulsion forms, oil particles become suspended in water. In such a scenario, there would not be a distinctive OWL. Such a limit on injected sea water flow rate can be accomplished, for example, through the use of valves 31 on the pumps 30 that pump the seawater into the vessel 12.

Since the vessel is connected to the flowline that carries the total field production, each corresponding well can be completed normally with a Christmas tree. Therefore, PVT samples, logging, well testing, or artificial lift methods can be applied normally, and are not affected by the vessel.

Figure 5:
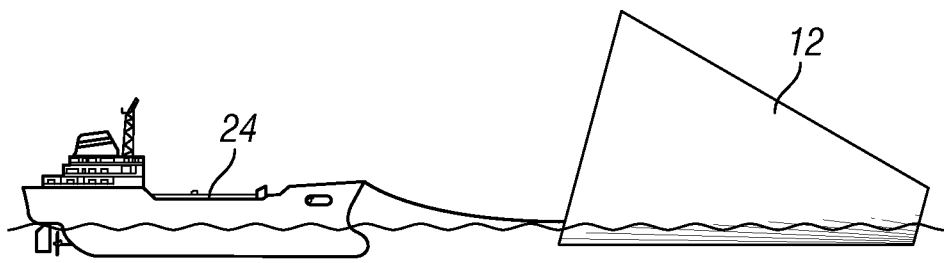
FIG. 5 is a side schematic view of a step in a method of installing and using the system of FIG. 1.
Figure 6:
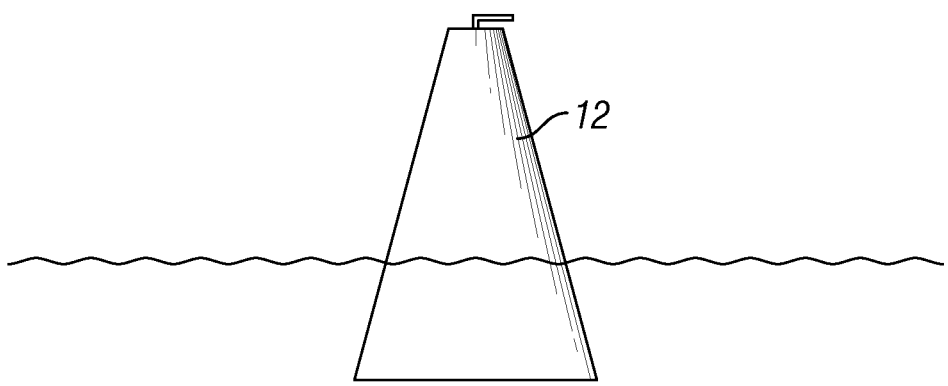
FIG. 6 is a schematic view of another step in a method of installing and using the system of FIG. 1.
Figure 7:
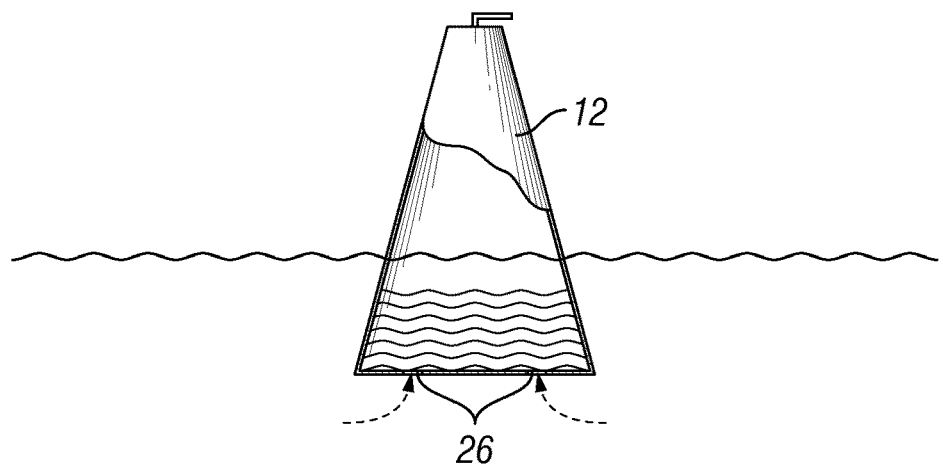
FIG. 7 is a side schematic view of another step in a method of installing and using the system of FIG. 1.
Figure 8:
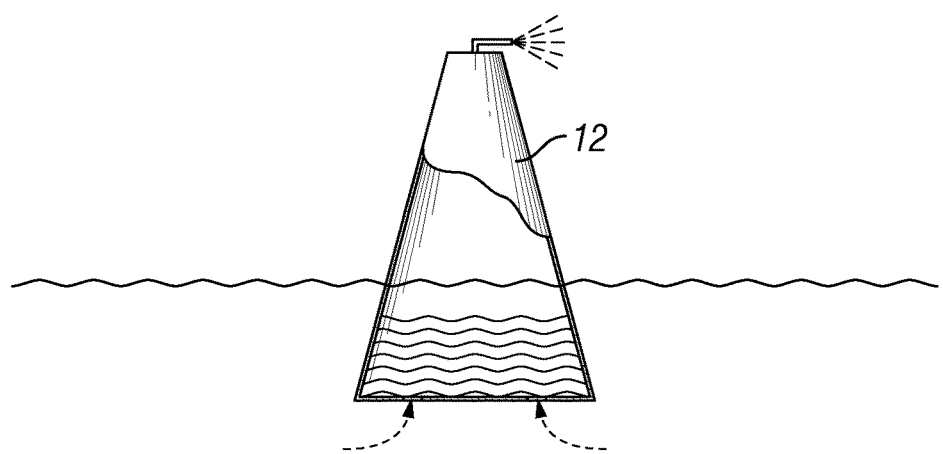
FIG. 8 is a side schematic view of another step in a method of installing and using the system of FIG. 1.
Figure 9:
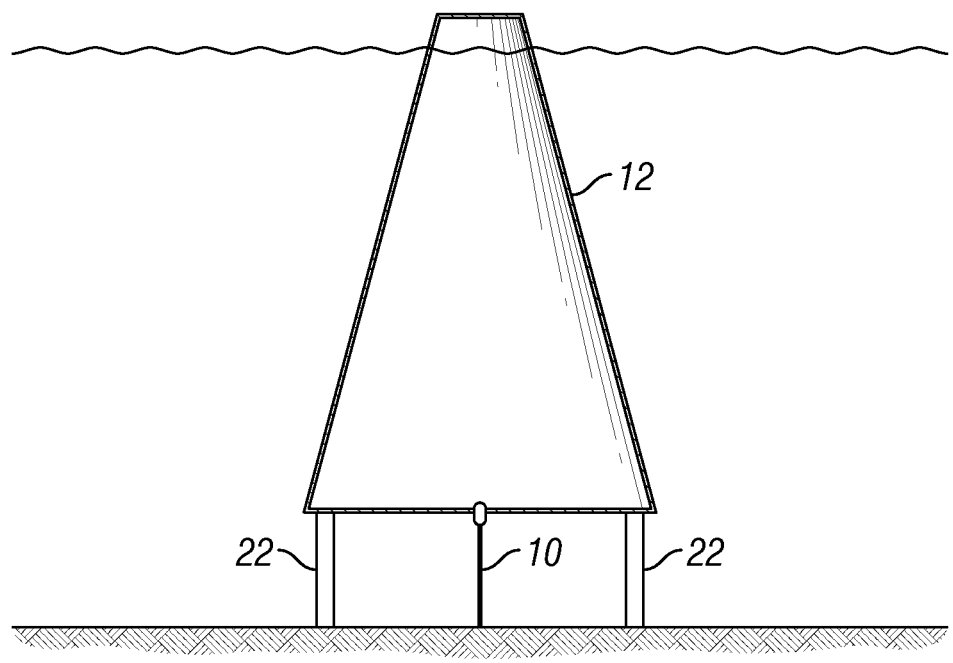
FIG. 9 is a side schematic view of another step in a method of installing and using the system of FIG. 1.
Figure 10:
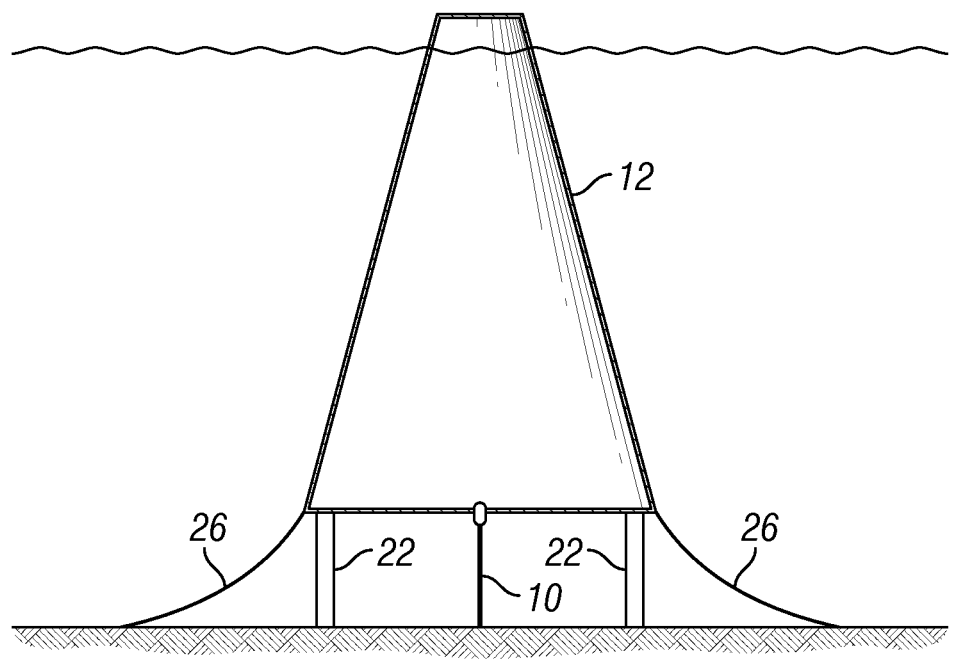
FIG. 10 is a side schematic view of another step in a method of installing and using the system of FIG. 1.
Figure 11:
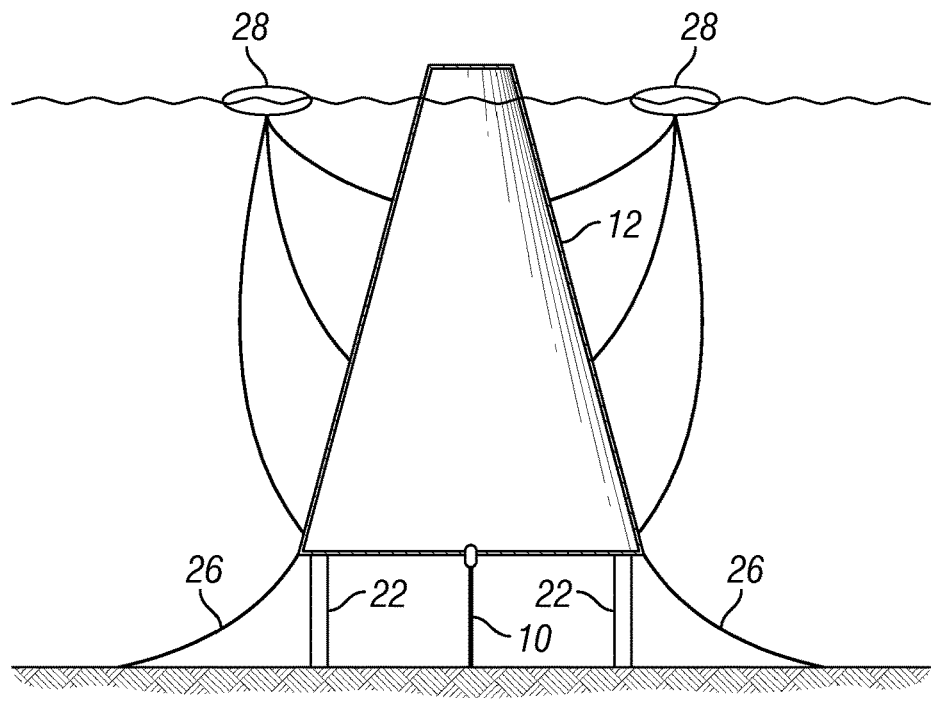
FIG. 11 is a side schematic view of another step in a method of installing and using the system of FIG. 1.
Figure 12:
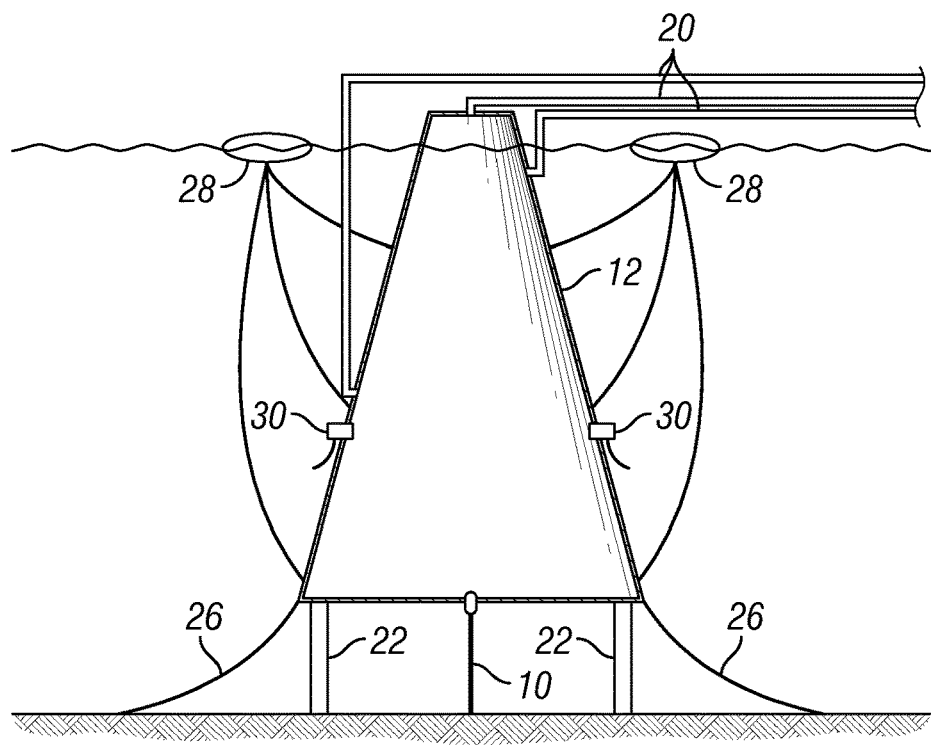
FIG. 12 is a side schematic view of another step in a method of installing and using the system of FIG. 1.

A method of installing and operating the technology will now be described. Initially, as shown in FIG. 5, the vessel 12 can be towed by a ship 24 on the sea surface to the desired location. Then, the vessel 12 is tilted as shown in FIG. 6, and seawater is allowed to fill the vessel 12 until the vessel 12 is partially submerged (FIG. 7). The seawater that enters the bottom of the vessel 12 by passing through a number of open sinks 26, which can optionally be equipped with wire meshes for basic filtration. The air trapped at the top of the vessel 12, however, prevents the vessel 12 from sinking. That air can then be released from the top of the vessel 12, as shown in FIG. 8, thereby lowering the vessel 12 to the desired depth. In some embodiments, a specific volume of air should remain at the top of the vessel 12 at this stage. The vessel 12 is then fixed to the seabed by pillars 22, as shown in FIG. 9, and at the same time can be secured to the sea floor using cables 26 (FIG. 10), as well as to several air-filled spheres 28 (FIG. 11), which help to support the vessel 12. Thereafter, the flowline (or production manifold) at the seabed can be connected to the pipe 10 at the bottom of the vessel 12. At the same time, as shown in FIG. 12, pipelines 20 can be connected to the vessel 12 to carry gas 14, oil 16, and other produced fluids 18 away from the vessel 12, such as, for example, to an onshore site, and pumps 30 can be attached to the vessel 12.

Figure 13:
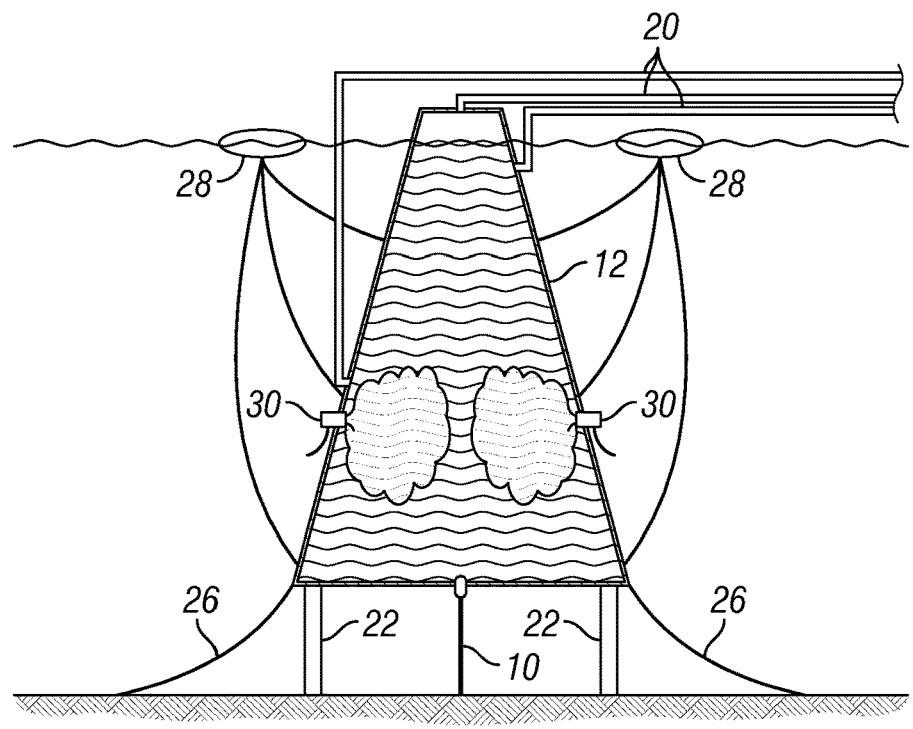
FIG. 13 is a side schematic view of another step in a method of installing and using the system of FIG. 1.
Figure 14:
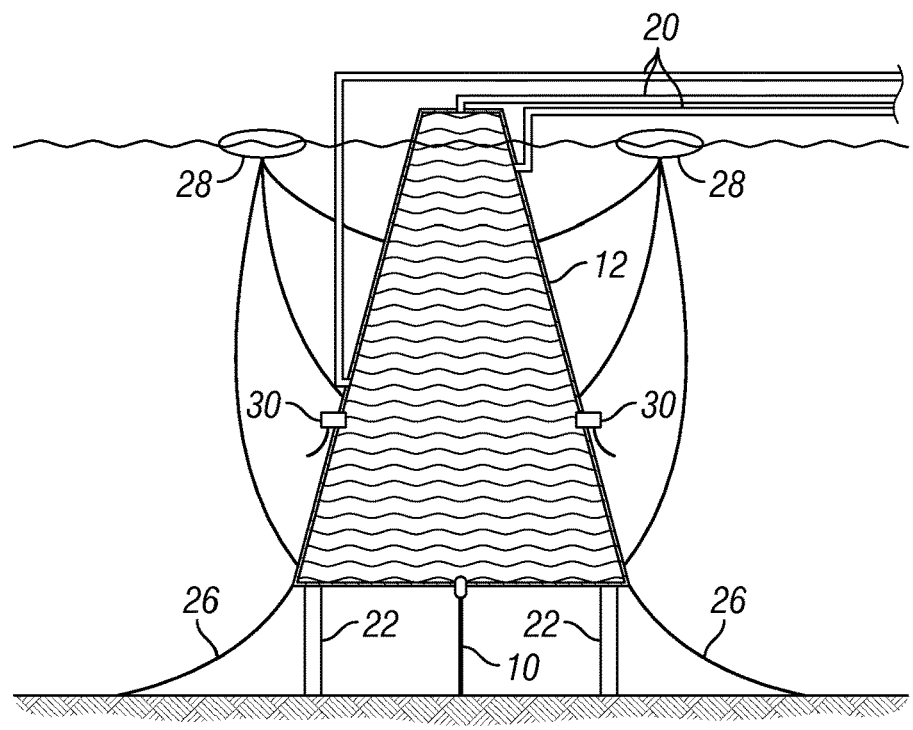
FIG. 14 is a side schematic view of another step in a method of installing and using the system of FIG. 1.
Figure 15:
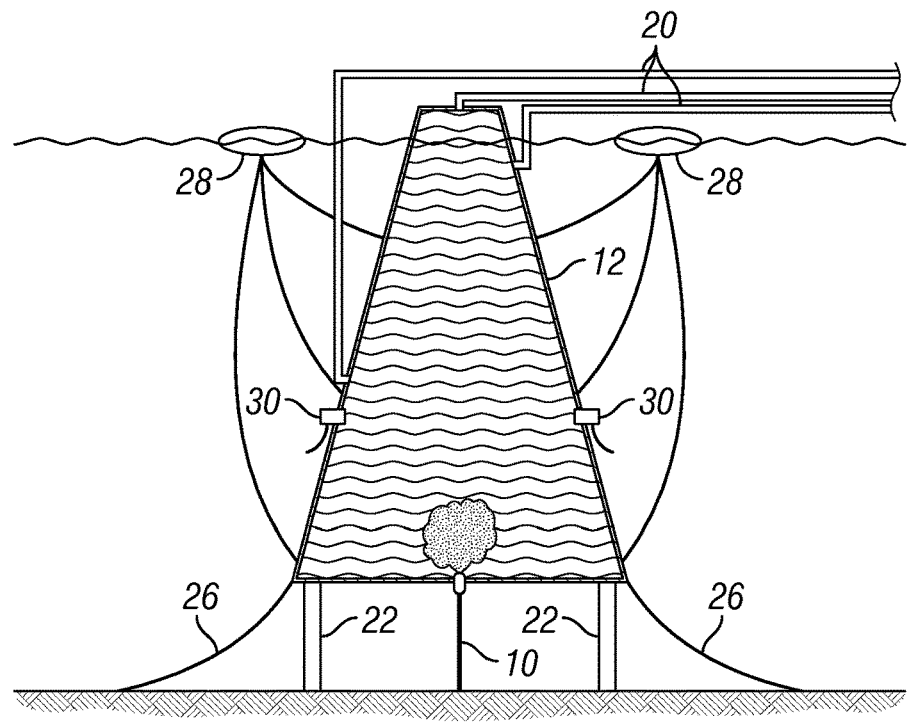
FIG. 15 is a side schematic view of another step in a method of installing and using the system of FIG. 1.
Figure 16:
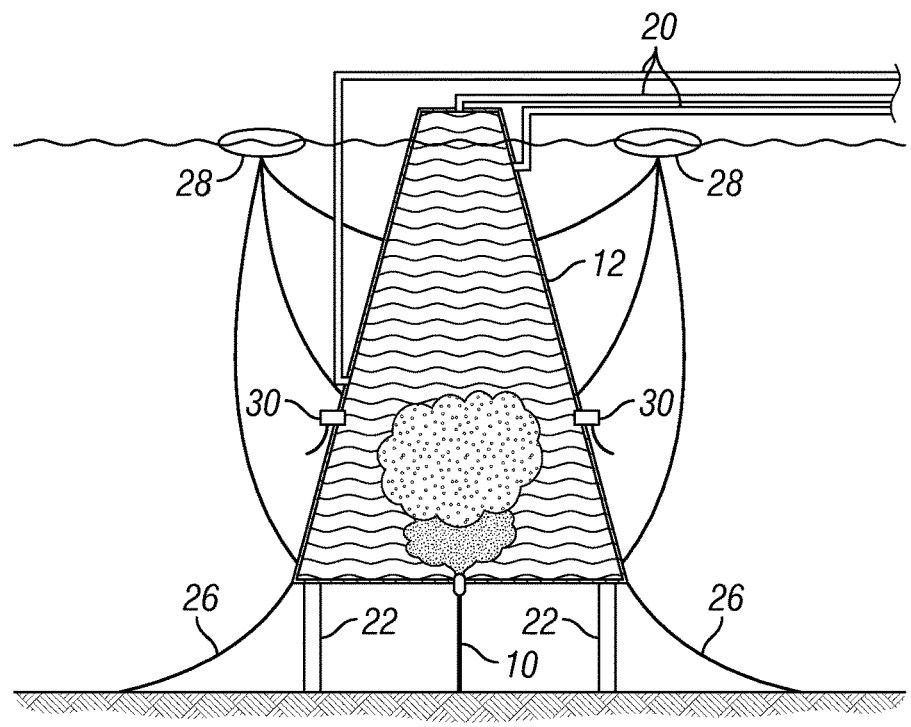
FIG. 16 is a side schematic view of another step in a method of installing and using the system of FIG. 1.
Figure 17:
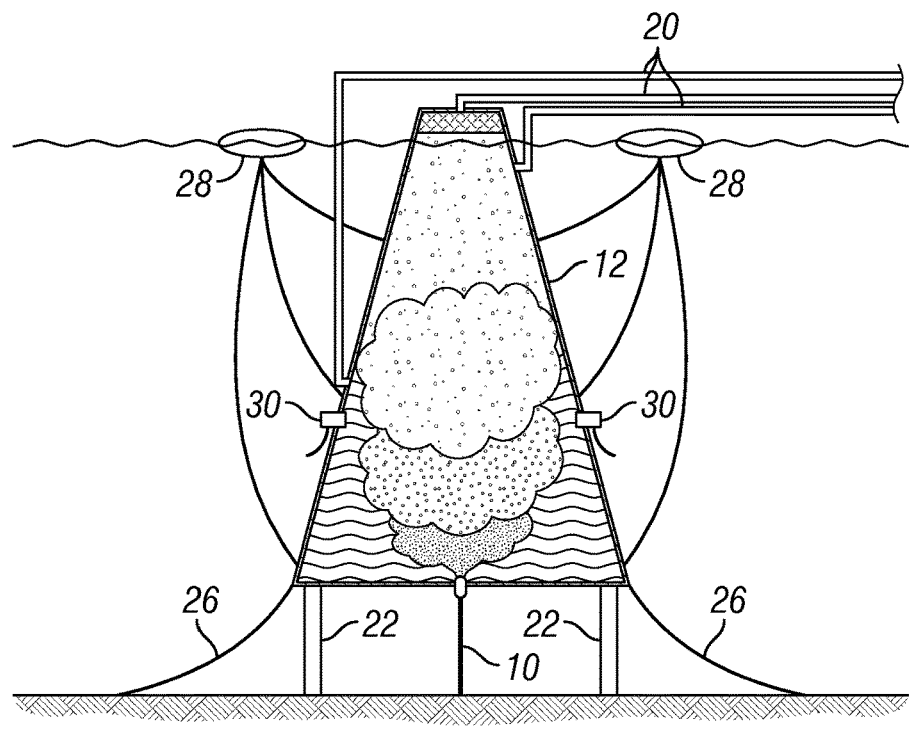
FIG. 17 is a side schematic view of another step in a method of installing and using the system of FIG. 1.
Figure 18:
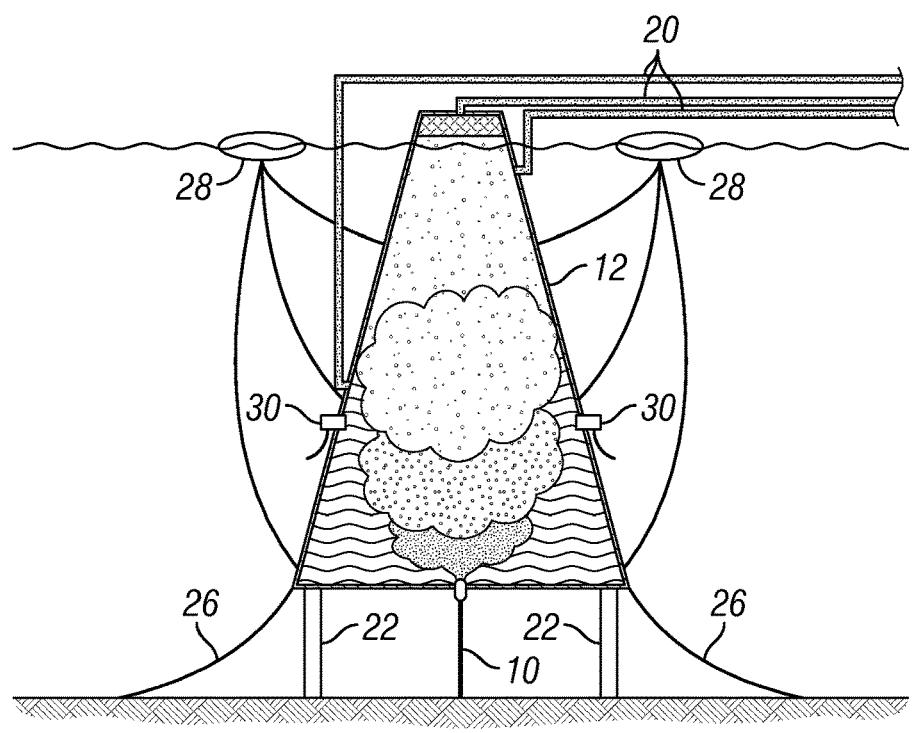
FIG. 18 is a side schematic view of another step in a method of installing and using the system of FIG. 1.
Figure 19:
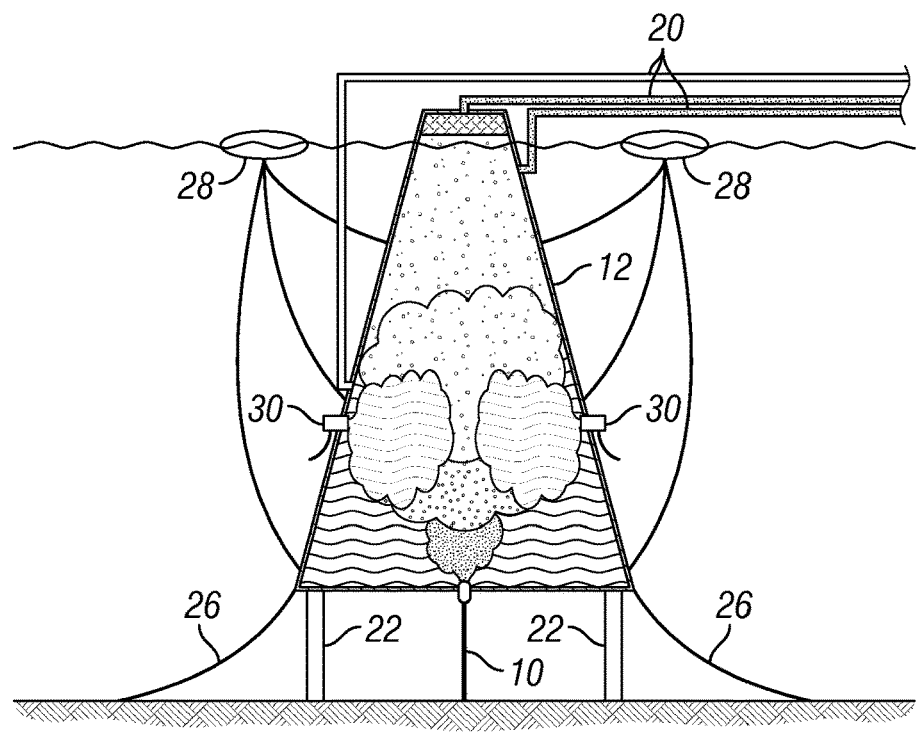
FIG. 19 is a side schematic view of another step in a method of installing and using the system of FIG. 1.

As shown in FIG. 13, when the vessel 12 is fixed to its place, and all flowlines and pipelines 20 are connected to it, seawater can be pumped through pumps 30 on the side of the vessel, or otherwise allowed into the vessel, while the valve at the top of the vessel is opened to allow air to escape. The pumps can continue to inject filtered seawater into the vessel 12 until the air trapped at the top of the vessel is fully displaced by the injected seawater, as shown in FIG. 14. Thereafter, field production is released at the bottom of the seawater filled vessel 12, as shown in FIG. 15. Buoyancy elevates crude oil from the bottom of the vessel towards the top, as shown in FIG. 16. As oil rises upward, its pressure decreases (due to reduction in hydrostatic pressure), and gas evolves after pressure falls below the bubble point, as shown in FIGS. 17-19. The gas, then, travels upward faster than the oil, due to its lower density. To avoid over pressurizing the vessel, the water occupying the lower part of the vessel 12 can be evacuated from the vessel 12 via the pipeline 20 attached to the portion of the vessel 12 adjacent the water. In addition, air can be released from an upper portion of the vessel to evacuate the air from the vessel. This step can be advantageous to assure that no oil or gas contacts oxygen in the air, as this could present a fire hazard. As a result of the evacuation of water from the vessel 12, the vessel 12 pressure will decline, allowing for more gas to separate from oil. After a while, a distinct OWL and GOL forms (as shown, for example, in FIG. 2). When a desired amount of oil or gas is separated and becomes available in the vessel 12, filtered seawater can be injected at the sides of the vessel to pressurize the separated oil and gas. Thereafter, opening a valve (not shown) to a pipeline 20 associated with the oil or gas results in producing pressurized flow oil or gas.

Figure 20:
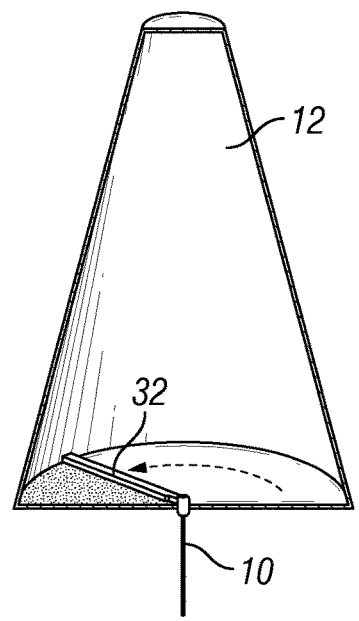
FIG. 20 is a side cross-sectional view of a vessel for collecting oil and gas, and including a scraper.

When oil enters the vessel it can experience temperature and pressure drops. Pressure drops can be controlled by injecting additional seawater into the vessel through the seawater injection pumps 30. Temperature, however, can be more difficult to control. In some instances, despite that the fact that the vessel 12 can be insulated, and can potentially be heated, temperature reduction can still occur. The result of such temperature reduction is that, at the lower portion of the vessel 12, resins and asphaltenes can precipitate and collect at the bottom of the vessel 12, as shown in FIG. 20. Accordingly, a scraper 32 can be provided to scrape the bottom of the vessel 12 and collect the resins and asphaltenes. On the other hand, as crude oil elevates in the vessel 12, the pressure exerted by the weight of the fluid column reduces. When this pressure reduction is enough to bring the crude oil pressure below the bubble point, gas evolves from the oil. Since gas has the lowest density of all the components in the vessel 12, it moves upward faster than the other components. Thus, it is possible, due to the combined effects of lower overhead pressure gas lift, that resins and asphaltenes could be suspended in the oil zone.

In certain situations, it may not be practical or economical to implement a full-scale vessel. In such a situation, a smaller scale vessel can be built, as shown, for example, in FIG. 21. Even though the riser pressure drop saved utilizing a smaller vessel is lower than a full-scale vessel, the natural separation of oil and gas can still be accomplished. Accordingly, a smaller vessel works according to the same principles of the full scale vessel.

The technology herein disclosed helps to resolve certain technical problems associated with subsea oil production. One of those problems is pressure drop in risers. As oil travels through a riser, gravitational and frictional forces can cause the crude oil to lose pressure in the riser. This pressure loss increases when the crude oil pressure falls below the bubble point, which changes the flow from a single-phase to a 2-phase (oil and gas) flow. Another problem resolved by the present technology is the need with current technology to invest in multiphase pumps to ship crude oil from platforms to onshore gas oil separation plants (GOSPs). Typically, after the crude oil reaches the platform, through risers, multiphase pumps are used to ship crude oil to a GOSP onshore. Some platforms are equipped with a GOSP, which separates oil and gas, but the oil loses pressure in the process. This results in a larger investment in oil pumps and in as compressors. The present technology resolves both of these technical problems by providing a device that both eliminates the need for risers, and that naturally separates the oil from the gas. In addition, this technology can be used at any stage of the field life of a well, including the abandonment phase.

Models and Experiments

As an example, and to illustrate the effect of utilizing a vessel like that of the above-described embodiments, a reservoir model was built assuming production through risers (model 1). In addition, 2 additional models were built assuming production through the proposed vessel (model 2, and 3). The parameters of the three models are the same except for variation in minimum flowing bottom-hole pressure (FBHP) of the oil well associated with each model. In model 1, the minimum FBHP was set to about 5,500 psi. Pressure drop in risers varies significantly with reservoir water depth and production stage. Therefore, two reasonable pressure drop values were considered. In model 2, the wellbore pressure drop due to the pressure drop in the riser was assumed to be about 1,000 psi. Therefore, FBHP was equal to about 4,500 psi in model 2. In model three, the wellbore pressure drop due to the pressure drop in the riser was assumed to be about 2,000 psi. Therefore, FBHP was equal to about 3,500 psi in model 3.

All models share the following properties and parameters:
2 Dimensional model
10×10 cells
Each cell is 2,500 ft×2,500 ft
Thickness=400 ft
Depth=12,000 ft
Initial Reservoir Pressure=9,000 psi
Bubble Point Pressure=4,000 psi
Porosity=25%
Horizontal Permeability=300 mD
Vertical Permeability=50 mD
The following PVT properties were used:

| p | Rs | Bo | z | viso | visg |
|---|---|---|---|---|---|
| 14.7 | 0 | 1 | 0.9999 | 1.2 | 0.0125 |
| 400 | 165 | 1.012 | 0.8369 | 1.17 | 0.013 |
| 800 | 335 | 1.0255 | 0.837 | 1.14 | 0.0135 |
| 1200 | 500 | 1.038 | 0.8341 | 1.11 | 0.014 |
| 1600 | 665 | 1.051 | 0.8341 | 1.08 | 0.0145 |
| 2000 | 828 | 1.063 | 0.837 | 1.06 | 0.015 |
| 2400 | 985 | 1.075 | 0.8341 | 1.03 | 0.0155 |
| 2800 | 1130 | 1.087 | 0.8341 | 1 | 0.016 |
| 3200 | 1270 | 1.0985 | 0.8398 | 0.98 | 0.0165 |
| 3600 | 1390 | 1.11 | 0.8299 | 0.95 | 0.017 |
| 4000 | 1500 | 1.12 | 0.83 | 0.94 | 0.0175 |
| 9000 | 1510 | 1.121 | 0.8301 | 0.93 | 0.0176 |

Oil density=44.986
Gas gravity=0.92
The following relative permeability and capillary pressure values were used:

| SWT Sw | krw | krow | Pcow |
|---|---|---|---|
| 0.15109 | 0 | 1 | 400 |
| 0.180306 | 7.82404e−007 | 0.990592 | 27.3408 |
| 0.194914 | 6.62563e−006 | 0.983136 | 22.9409 |
| 0.22413 | 1.8312e−005 | 0.964242 | 18.3843 |
| 0.253346 | 3.68251e−005 | 0.943733 | 15.5504 |
| 0.282562 | 0.000105562 | 0.909425 | 14.3728 |
| 0.304915 | 0.000163382 | 0.883175 | 13.4719 |
| 0.326386 | 0.00021892 | 0.857961 | 12.6066 |
| 0.347104 | 0.000272509 | 0.805981 | 8.59783 |
| 0.37021 | 0.0230609 | 0.565222 | 0 |
| 0.375229 | 0.0293539 | 0.498658 | 0 |
| 0.403355 | 0.0713724 | 0.171756 | 0 |
| 0.43148 | 0.0868187 | 0.128584 | 0 |
| 0.459606 | 0.103824 | 0.0971953 | 0 |
| 0.487732 | 0.122245 | 0.0720211 | 0 |
| 0.51629 | 0.14238 | 0.0517967 | 0 |
| 0.545506 | 0.16506 | 0.0377328 | 0 |
| 0.574722 | 0.188013 | 0.0241556 | 0 |
| 0.603938 | 0.213077 | 0.015662 | 0 |
| 0.633154 | 0.239975 | 0.010302 | 0 |
| 0.656485 | 0.261489 | 0.00636467 | 0 |
| 0.676978 | 0.282264 | 0.00437906 | 0 |
| 0.698674 | 0.304301 | 0.00268985 | 0 |
| 0.720802 | 0.327792 | 0.0014622 | 0 |
| 0.740862 | 0.350697 | 0.00114185 | 0 |
| 0.768988 | 0.382816 | 0.000692688 | 0 |
| 0.797113 | 0.414936 | 0.000243525 | 0 |
| 0.825239 | 0.442781 | 1.5985e−005 | 0 |
| 0.853364 | 0.46639 | 7.99251e−006 | 0 |
| 0.88149 | 0.49 | 0 | 0 |

| SLT Sl | krg | krog | Pcog |
|---|---|---|---|
| 0.15109 | 1 | 0 | 3.9 |
| 0.168068 | 0.978622 | 0 | 3.85439 |
| 0.202025 | 0.935866 | 0 | 3.76318 |
| 0.231981 | 0.898146 | 0 | 3.68271 |
| 0.252959 | 0.871731 | 0 | 3.62636 |
| 0.280516 | 0.837034 | 0 | 3.55234 |
| 0.303894 | 0.796908 | 0 | 3.48053 |
| 0.32905 | 0.721718 | 0 | 3.35475 |
| 0.354828 | 0.641161 | 0 | 3.22586 |
| 0.377585 | 0.570047 | 0 | 3.11208 |
| 0.405763 | 0.499134 | 0 | 2.97118 |
| 0.426119 | 0.479104 | 0 | 2.8694 |
| 0.458476 | 0.453219 | 0 | 2.70762 |
| 0.490832 | 0.427334 | 0 | 2.54584 |
| 0.52461 | 0.400312 | 0 | 2.37695 |
| 0.555545 | 0.375564 | 0 | 2.22228 |
| 0.575545 | 0.359564 | 0 | 2.12227 |
| 0.60408 | 0.335921 | 0.000815925 | 1.97961 |
| 0.62648 | 0.31352 | 0.00529594 | 1.8676 |
| 0.648 | 0.292 | 0.00960004 | 1.76 |
| 0.672 | 0.268 | 0.0144 | 1.64 |
| 0.696 | 0.243687 | 0.0192 | 1.52 |
| 0.72 | 0.212 | 0.0360001 | 1.4 |
| 0.745327 | 0.176542 | 0.0562617 | 1.27337 |
| 0.768 | 0.1448 | 0.0744 | 1.16 |
| 0.792 | 0.1112 | 0.0935999 | 1.04 |
| 0.816 | 0.08752 | 0.1368 | 0.92 |
| 0.84 | 0.0688 | 0.192 | 0.800003 |
| 0.864174 | 0.049944 | 0.2476 | 0.67913 |
| 0.888 | 0.03136 | 0.3024 | 0.560002 |
| 0.915109 | 0.0164601 | 0.397991 | 0.424457 |
| 0.936 | 0.00880006 | 0.492 | 0.32 |
| 0.96 | 0 | 0.6 | 0.200001 |
| 0.976 | 0 | 0.759999 | 0.120001 |
| 1 | 0 | 1 | 0 |

The reservoir produced from 17 oil wells: 10 horizontal wells and 7 vertical wells. Initially, all horizontal producers operated under a constant maximum flow rate of about 5,000 STB/D, and all vertical producers operated under constant maximum flow rate of about 2,000 STB/D. When the oil operators could not sustain their corresponding maximum flow rate, they switched to the minimum allowable FBHP (the value depends on each model, as described earlier).

Figure 22:
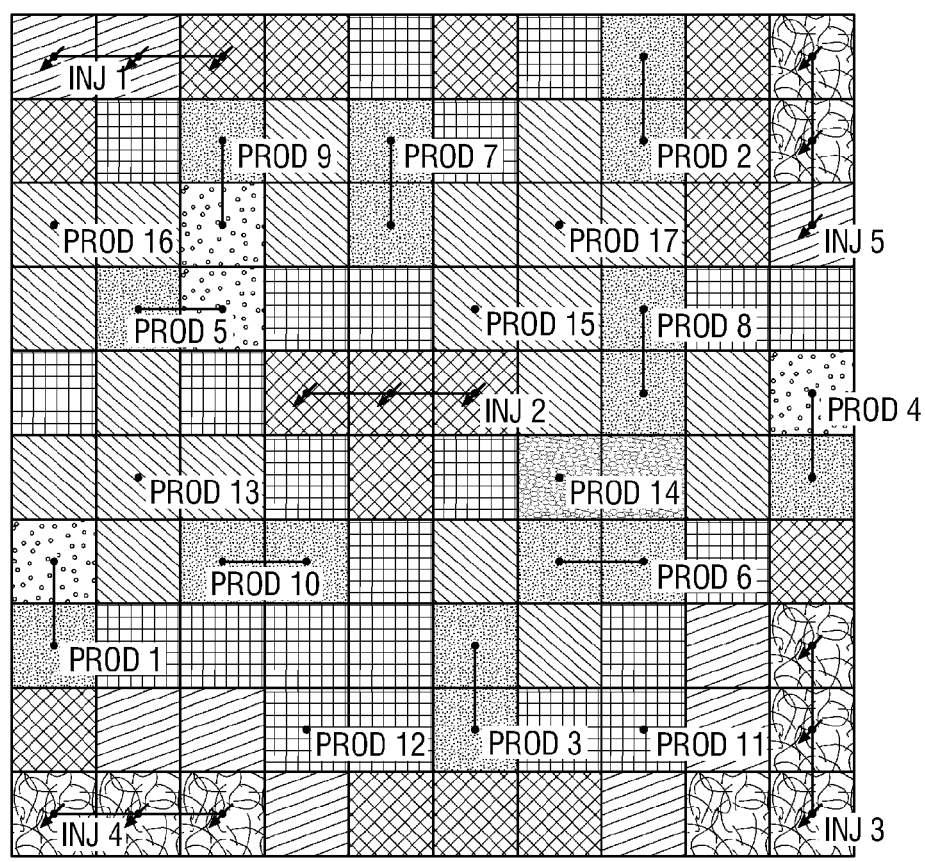
FIG. 22 is a two dimensional representation of a model reservoir according to an embodiment of the present technology.
Figure 23:
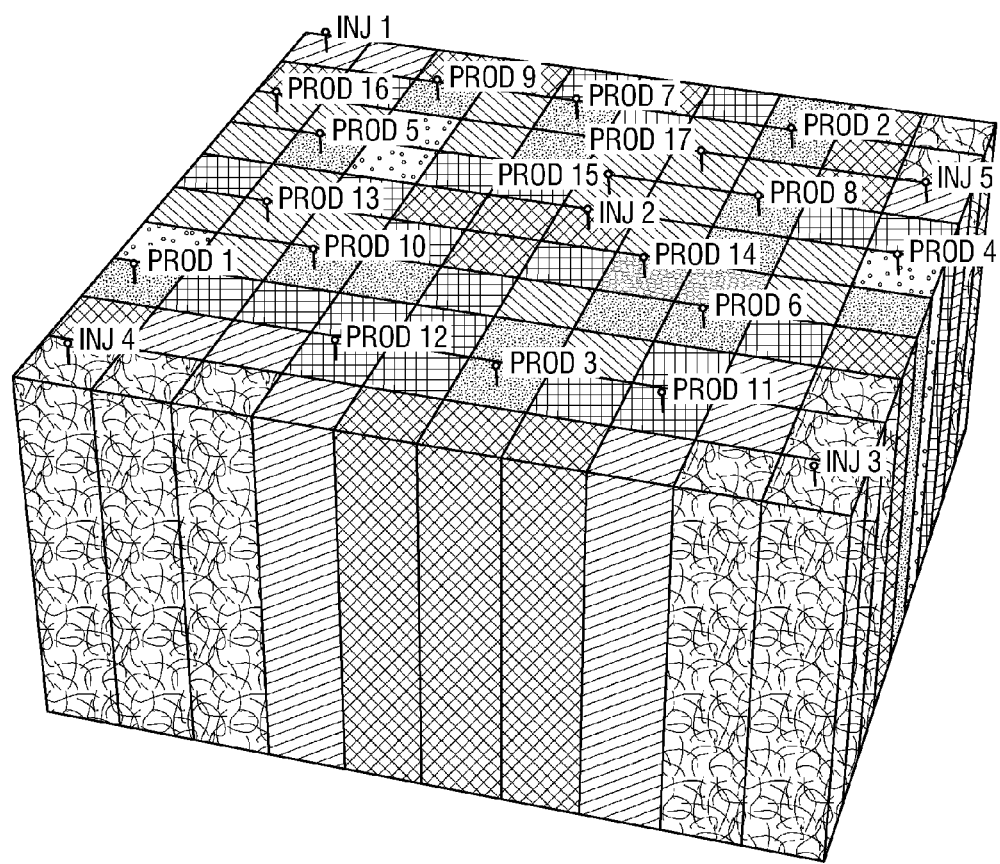
FIG. 23 is a three dimensional representation of the model reservoir of FIG. 22.

The reservoir had 5 horizontal water injectors (for pressure support), operating under maximum 10,000 STBW/D injection rate. A two dimensional representation of the reservoir model is presented in FIG. 22, and a 3-D model is presented in FIG. 23.

Figure 24:
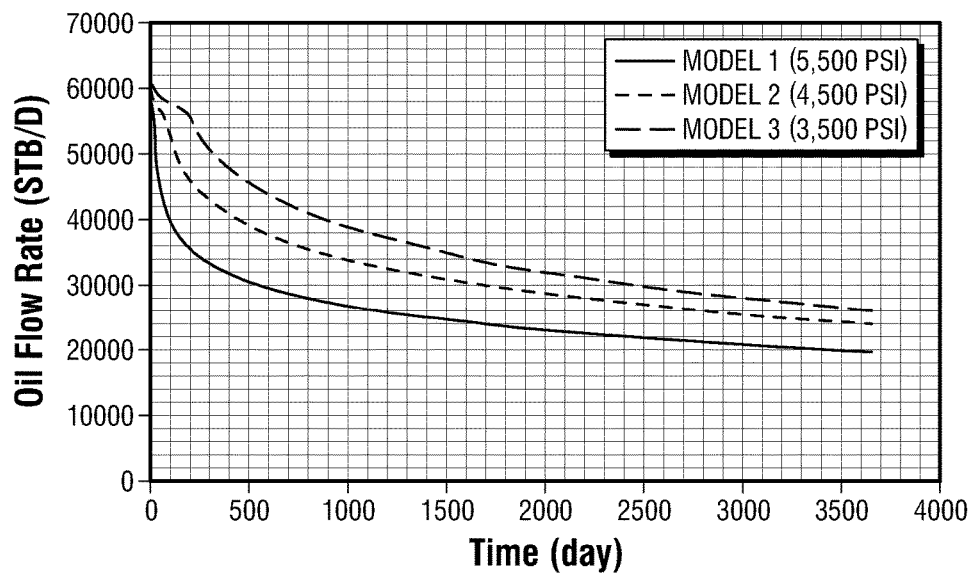
FIG. 24 is a chart showing the total reservoir production rate for different models representing embodiments of the present technology.
Figure 25:
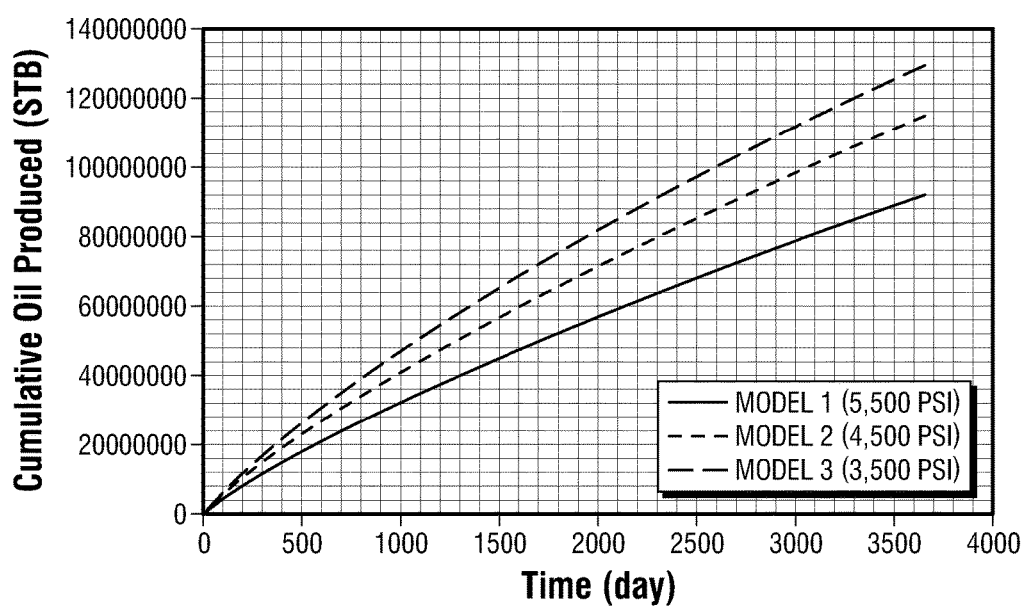
FIG. 25 is a chart showing total cumulative production for different models represented in FIG. 24.

The total reservoir production rate (STB/D) for each model over 10 years is presented in FIG. 24, and the cumulative production is presented in FIG. 25. As shown in the charts of FIGS. 24 and 25, the increase in cumulative oil produced from the base case (model 1) to the case with lowest FBHP (model 3) is 41%. Notably, as risers increase in length (the distance from sea surface to seabed) their pressure drop increases as well. Therefore, when the proposed vessel is employed, thereby eliminating the riser pressure drop, an oil producer can produce under a lower FBHP (related to the riser pressure drop through nodal analysis). Lowering the FBHP in the oil wells results in higher flow rates, thereby increased recovery.

Although the technology herein has been described with reference to particular embodiments and experimental examples, it is to be understood that these embodiments are merely illustrative of the principles and applications of the present technology. It is therefore to be understood that numerous modifications can be made to the illustrative embodiments and that other arrangements can be devised without departing from the spirit and scope of the present technology as defined by the appended claims.

That claimed is:

1. A method of producing oil and hydrocarbon gas from a well, the method comprising the steps of:
   a) channeling field production from the well directly into a sealed tapered vessel through an inlet pipe, wherein the tapered vessel:
      tapers into a top with a smaller diameter than a portion of the tapered vessel below the top;
      comprises a plurality of outlet lines, each configured to provide extraction of a separate fluid component from the tapered vessel;
      has a lowermost bottom, and is sufficiently sealed to maintain a desired pressure, wherein the inlet pipe is attached and secured to the bottom of the vessel in a manner operable to prevent the produced oil and gas from escaping the system and extends from the bottom to the well; and
      is supported by pillars extending between the seabed and the bottom of the vessel, where the bottom of the vessel is spaced axially above and apart from a seabed, and where the pillars are spaced apart from a subsea gathering production manifold or a wellhead;
   b) separating oil and hydrocarbon gas components of the field production from water and other fluids within the tapered vessel through the use of buoyancy;
   c) evacuating the separated oil and hydrocarbon gas from the tapered vessel via the plurality of outlet lines that are sealed from the environment; and
   d) pumping seawater into the tapered vessel to pressurize the tapered vessel and thereby aid in the production of oil and hydrocarbon gas from the tapered vessel with a pump that is located at, and attached to, a side of the vessel below the sea surface.

2. The method of claim 1, further comprising:
   before step c), lowering the pressure in the vessel to allow for hydrocarbon gas to gather to the top of the tapered vessel.

3. The method of claim 1, further comprising:
stopping the introduction of seawater into the tapered vessel before the tapered vessel reaches a maximum allowable pressure of the inlet pipe.

4. The method of claim 1, further comprising:
insulating the tapered vessel to reduce cooling of the tapered vessel to minimize the formation of hydrates within the tapered vessel.

5. The method of claim 4, further comprising:
adding anti-hydrate additives to the seawater pumped into the tapered vessel to further minimize the formation of hydrates within the tapered vessel.

6. The method of claim 1, further comprising:
limiting the flow rate of a hydrocarbon free seawater pumped into the tapered vessel to reduce emulsion of the seawater with oil in the tapered vessel.

7. The method of claim 1, further comprising:
injecting seawater into the tapered vessel until a trapped air at the top of the tapered vessel is displaced by the injected seawater.

8. The method of claim 1, wherein the hydrocarbon gas is evacuated from a tapered portion of the tapered vessel.

9. The method of claim 1, wherein the seawater pumped into the tapered vessel is free of hydrocarbons.

10. The method of claim 1, wherein the field production flows from the well to the sealed tapered vessel free of a pump.

11. They system of claim 1, wherein each of the plurality of outlet lines are sealed from the environment, both when a valve of each of the plurality of outlet lines are in a closed position and when the valve of each of the plurality of outlet lines are in an open position.

* * * * *